United States Patent [19]

Aoki et al.

[11] Patent Number: 4,585,479

[45] Date of Patent: Apr. 29, 1986

[54] WELDING MATERIAL OF FERRITE-AUSTENITE TWO-PHASE STAINLESS STEEL AND METHOD OF APPLICATION

[75] Inventors: Masahiro Aoki; Kiichi Saito; Takeshi Yoshida; Noriyasu Ikeda; Masanori Takahashi, all of Jyouetsu; Masao Okubo; Masaaki Nagayama, both of Niihama, all of Japan

[73] Assignees: Sumitomo Chemical Co., Ltd., Osaka; Nippon Stainless Steel Co., Ltd., Tokyo, both of Japan

[21] Appl. No.: 580,667

[22] Filed: Feb. 16, 1984

[30] Foreign Application Priority Data

Feb. 17, 1983 [JP] Japan ................................. 58-25190

[51] Int. Cl.⁴ ............................................. C22C 38/40
[52] U.S. Cl. ................................ 75/128 N; 75/128 C; 228/263.11; 228/263.15; 219/146.23
[58] Field of Search ............. 75/128 R, 128 C, 128 N; 148/37, 38; 219/85 H, 146.23; 228/263.11, 263.15

[56] References Cited

U.S. PATENT DOCUMENTS 4,002,510  1/1977  Wilde ..................................... 148/38
4,032,367  6/1977  Richardson et al. ............. 75/128 C

FOREIGN PATENT DOCUMENTS 55-47370  4/1980  Japan ..................................... 148/38
6127751  10/1981  Japan ................................. 75/128 R Primary Examiner—L. Dewayne Rutledge
Assistant Examiner—Deborah Yee
Attorney, Agent, or Firm—Harry M. Weiss & Associates

[57] ABSTRACT

This invention relates to a welding material of ferrite-austenite two-phase stainless steel capable of producing a weld metal having a high resistance to corrosion, particularly in an environment containing nitric acid, and the method of application therefor. The welding material consists essentially of not more than 0.03% of C, not more than 2.0% of Si, not more than 2.0% of Mn, 25 to 30% of Cr, 7 to 12% of Ni, not more than 0.35% of N, and the balance Fe and inevitable impurities. The Ni balance value given by the following formula ranges between $-11.7$ and $-6.7$:

Ni balance value = Ni% + 0.5 × Mn% + 30 × (C+N)% − 1.1 (Cr% + 1.5 × Si%) + 8.2.

7 Claims, 5 Drawing Figures

(X400)

(X400)

(X400)

(X400)

WELDING MATERIAL OF FERRITE-AUSTENITE TWO-PHASE STAINLESS STEEL AND METHOD OF APPLICATION

BACKGROUND OF THE INVENTION

1. Field of the Invention

The present invention relates generally to welding material and the method of application therefor and, more particularly, to a welding material of ferrite-austenite two-phase stainless steel capable of producing a weld metal having a high resistance to corrosion, particularly in an environment containing nitric acid, and the method of application therefor.

2. Description of the Prior Art

In the past, ordinary austenite steels such as those specified in JIS (Japanese Industrial Standard) as SUS 304 and SUS 304L have been used as materials for structures which are used in a nitric acid environment having a comparatively low concentration of up to around 40 wt%. These materials exhibit sufficient resistance to corrosion under a nitric acid environment of such a low concentration. However, these materials exhibit a greater tendency of preferential corrosion of grain boundary, i.e., intergranular corrosion, as the concentration of the nitric acid in the environment is increased. In fact, these materials cannot withstand use in a solution containing 65% HNO₃ which is known as a Huey test solution used in one of the common testing methods for testing the resistance of material to intergranular corrosion.

Therefore, under severe influence of nitric acid which enhances intergranular corrosion, it has been common to use stainless steels of extreme low carbon content such as JIS SUS 310 SLC and high-chromium, high-nickel austenite stainless steel, e.g., Uranus 65 (brand name of product from Creusot-Loire Co.) (C 0.03%, Cr 25.5%, Ni 20%, Nb 0.25%) forming a strong passive film stabilized by addition of elements such as Nb.

The austenite stainless steels having such high Cr and Ni contents, however, suffer from the following problems.

Namely, these stainless steels have only a small amount of a solid solution of carbon, so that, when heated to 500° to 900° C. or when subjected to heat produced by welding, the chromium carbides are preferentially precipitated in the grain boundaries enhancing the tendency of intergranular corrosion. In addition, these materials have high sensitivity to solidification cracking which makes the weld unreliable.

In contrast, ferrite-austenite two-phase stainless steels usually have high Cr contents and exhibit greater resistance to solidification cracking in welding. However, these stainless steels tend to cause a selective corrosion between structures due to, for example, the effect of weld heat. This tendency of corrosion is serious particularly in an environment having high concentrations of nitric acid. Thus, conventional two-phase stainless steel could not be used with sufficient reliability as nitric acid resistant material having welded structure.

To obviate these problems, the present inventors have proposed, as a metallic material having a higher resistance to intergranular corrosion than the conventional high-chromium, high-nickel steels in environments having high concentrations of nitric acid, a ferrite-austenite two-phase stainless steel of a 27Cr-8Ni-0.1N system. More specifically, this steel essentially consists of not more than 0.03% of C, not more than 2.0% of Si, not more than 2.0% of Mn, 25 to 35% of Cr, 6 to 15% of Ni, not more than 0.35% of N, and the balance Fe and inevitable impurities, and has an Ni balance value given by the following formula ranging between −13 and −9:

$$\text{Ni balance value} = -\text{Ni}\% + 0.5 \times \text{Mn}\% + 30 \times (\text{C}+\text{N})\% - 1.1(\text{Cr}\% + 1.5 \times \text{Si}\%) + 8.2$$

Unfortunately, however, no welding material has been developed which would suitably be used together with the above-mentioned two-phase stainless steel. Thus, there still is a demand for a welding material which can be used suitably in combination with the stainless steel of the type mentioned above to produce a ferrite-austenite two-phase weld structure thereby obviating the problem concerning corrosion.

In the past, welding material of a 25Cr—5Ni—2Mo system, as well as materials obtained by adding Cu, and the like additives to this system, e.g., WEL 25-5 and WEL 25-5 Cu sold by Nippon Welding Rod Company, have been used as the welding material which can produce a ferrite-austenite two-phase weld structure when used in combination with two-phase stainless steel of a ferrite-austenite system, for example SUS 329J1.

Also known are the welding materials such as E312 (C≦0.08%, Si≦0.9%, Mn 0.5-2.5%, Cr 17-20%, Ni 11-14%, Mo 2-25%, Cu≦0.5%) and ER312 (C≦0.15%, Si 0.3-0.65%, Mn 1-2.5%, Cr 18-32%, Ni 8-10.5%, Mo≦0.5%, Cu≦0.5%) as specified by the Standard of American Welding Society, as the welding materials suitable for use in combination with stainless steels of a Fe—Cr—Ni system.

These known welding materials, however, are not suitable for use in combination with the two-phase stainless steels which are required to withstand high concentrations of nitric acid, because they cannot produce sufficient resistance to corrosion due to the following reasons. Namely, these welding materials cannot offer superior resistance to corrosion by nitric acid, partly because they contain Mo and Cu which impair the resistance to corrosion in nitric acid environments and partly because the Cr content is as small as less than 25%. In addition, the small C content which usually falls around 0.08% decreases the resistance to intergranular corrosion in the weld part and makes these materials unsuitable for use in environments containing nitric acid which act to enhance intergranular corrosion.

SUMMARY OF THE INVENTION

Accordingly, it is the primary object of the invention to obviate the problems encountered by the known welding materials when they are employed in the welding of a structure which is to be used in an environment containing nitric acid.

Namely, it is an object of the invention to provide a welding material which can produce a weld metal having a superior resistance to corrosion when used in an environment having a medium concentration of nitric acid up to the azeotropic concentration (68 wt%) and a method of application therefor.

The above and other objects, features and advantages of the invention will become clear from the following description of the preferred embodiments taken in conjunction with the accompanying drawings.

DESCRIPTION OF THE PREFERRED EMBODIMENTS

Figure 1:
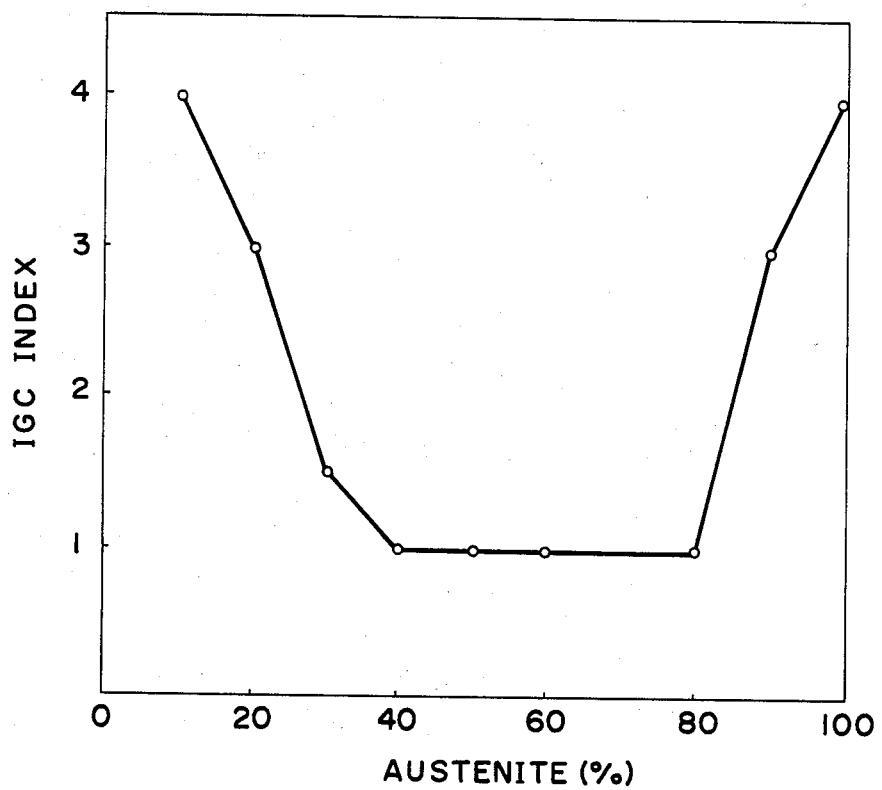
FIG. 1 is a graph showing the relationship between the resistance to corrosion by nitric acid in the weld part and the austenite content (percentage by volume) of the welding material.

The present inventors have conducted an intense study as to how the resistance of stainless steel to corrosion by nitric acid is affected by the structure and the traces, i.e., elements contained only by trace amounts. As a result, the inventors have found that the following welding material of high-chromium two-phase stainless steel can overcome the problems of the known welding materials of conventional austenite stainless steels and two-phase stainless steels.

Namely, the welding material has higher Cr and Ni contents than those in the welding materials of a 25 Cr—5Ni—2Mo system used conventionally for ferrite-austenite stainless steels. In addition, the welding material of the invention has a specific Ni balance value. Furthermore, the welding material of the invention can ensure a superior performance even though its Ni content is smaller than that of the conventionally used austenite stainless steel.

According to the invention, there is provided a welding material of ferrite-austenite two-phase stainless steel consisting essentially of not more than 0.03% of C, not more than 2.0% of Si, not more than 2.0% of Mn, 25 to 30% of Cr, 7 to 12% of Ni, not more than 0.35% of N, and the balance Fe and inevitable impurities, wherein the Ni balance value given by the following formula ranges between $-11.7$ and $-6.7$:

$$\text{Ni balance value} = \text{Ni\%} + 0.5 \times \text{Mn\%} + 30 \times (\text{C}+\text{N})\% - 1.1(\text{Cr\%} + 1.5 \times \text{Si\%}) + 8.2$$

Hereinafter, an explanation will be given concerning the reasons for limiting the contents of the respective elements in the chemical compositions of the welding material in accordance with the invention.

C: C is an effective austenite former. The C content, however, is preferably small because C forms carbides which act to increase the sensitivity of intergranular corrosion. However, from the view point of ease of production of the welding material in an industrial scale, a C content up to 0.03% is acceptable.

Si and Mn: Si and Mn are elements which are used as deoxidizers in the steel making process. For an easy production in an industrial scale, addition of not more than 2.0% of each Si and Mn element is necessary. For this reason, the Mn and Si contents not greater than 2.0% are allowed.

Cr: Cr is an element essential as a ferrite former and is an important element which is necessary for the formation of two-phase structure of austenite and ferrite. In particular, Cr is an important element for attaining sufficient resistance to corrosion by nitric acid, it is necessary to add Cr by an amount not smaller than 25%. Under a proper structural balance, the resistance to corrosion by nitric acid is enhanced as the Cr content is increased. However, any Cr content exceeding 30% undesirably increases the hardness to impede cold drawing of the welding material, and to seriously impair the toughness and ductility of the weld metal resulting in a degradation of the performance of the weld joint.

Ni: Ni is an austenite former which plays an important role in the formation of the two-phase structure together with Cr. Ni is important also as an element which reduces the active dissolution rate such as general corrosion. Considering that the weld metal is affected thermally by rapid heating and cooling, the Ni content is preferably selected to range between 7 and 12% for obtaining a good condition of structure (a ratio between austenite content and ferrite content), corresponding to the content of Cr which is the main ferrite former.

N: N is a strong austenite former as are the cases of C and Ni, and is effective also in preventing corrosion such as pitting. However, an N content exceeding 0.35% causes blow holes in the steel ingot in the production of stainless steel and impairs the hot workability of the steel ingot. For this reason, the N content is selected to be not greater than 0.35%.

One of the characteristic features of the invention resides in that the highest corrosion resistance is obtained through the optimum combination of these constituents rather than the effects of independent constituents. More specifically, according to the invention, the contents of the constituents are limited within the ranges mentioned below to make the austenite content (percentage by volume) in the weld part fall within the range of between 40 and 80% by volume:

$$-11.7 < \text{Ni balance value} < -6.7$$

where, $$\text{Ni balance value} = \text{Ni\%} + 0.5 \times \text{Mn\%} + 30 \times (\text{C}+\text{N})\% - 1.1(\text{Cr\%} + 1.5 \times \text{Si\%}) + 8.2$$

FIG. 1 shows the relationship between the austenite content (percentage by volume) and the resistance to corrosion by nitric acid, particularly intergranular corrosion index (referred to as "IGC Index") hereinafter. From this figure, it will be seen that the weld metal exhibits a good resistance to corrosion by nitric acid, i.e., almost no intergranular corrosion, when the austenite content ranges between 40 and 80% by volume.

The term IGC Index is used here to mean the extend of the intergranular corrosion as observed in the corrosion test mentioned later in the description of the embodiment. More specifically, there are the following classes of extent of the the intergranular corrosion:
1. almost no intergranular corrosion;
2. slight intergranular corrosion;
3. considerable intergranular corrosion (intermediate the classes 2 and 4);
4. heavy intergranular corrosion.

When the Ni balance takes a value not greater than $-11.7$, the austenite content falls below 40% by volume to enhance the tendency of selective corrosion between structure in the weld part. With this value of Ni balance, it is not possible to improve the resistance to corrosion by nitric acid however the Cr content may be increased. Rather, an increase in the Cr content shifts the Ni balance value for smaller resistance to corrosion by nitric acid, thereby accelerating the corrosion.

On the other hand, and increase of the Ni balance beyond −6.7 causes the austenite content to be increased beyond 80% by volume, and unfavorably impairs the intergranular corrosion resistance in the weld part because this approaches a singlephase structure of austenite and uneconomically requires a greater amount of addition of Ni which is expensive. In addition, the hot workability is impaired disadvantageously. Therefore, the Ni balance value preferably ranges between −11.7 and −6.7.

An embodiment of the invention will be described hereinunder.

EMBODIMENT

Sheets of 5 mm thick were prepared from the aforementioned ferrite-austenite two-phase stainless steel, consisting essentially of 27Cr—8Ni—0.1N and having resistance to corrosion by nitric acid. Using these sheets as the base metal, samples of welded structure were produced by TIG welding with various welding materials as shown in Table 1 below. These samples were subjected to 5 (five) repititional cycles of a 48 hour boiling test in a 65% nitric acid solution with addition of 100 ppm of chromate-ion. The solution was renewed for each cycle of the test to keep a volume of solution per unit area of specimen not smaller than 20 cc/cm$^2$.

Figure 2:
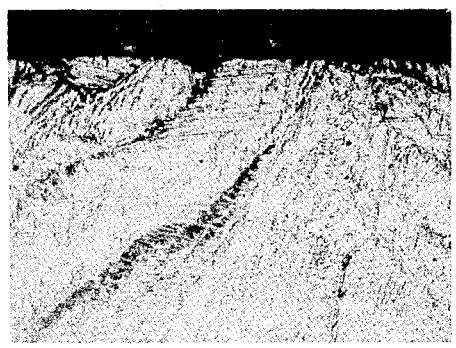
FIGS. 2 to 5 are microscopic photos of the weld metals obtained with the welding material of the invention and the comparison welding materials (magnification 400).
Figure 3:
Figure 4:
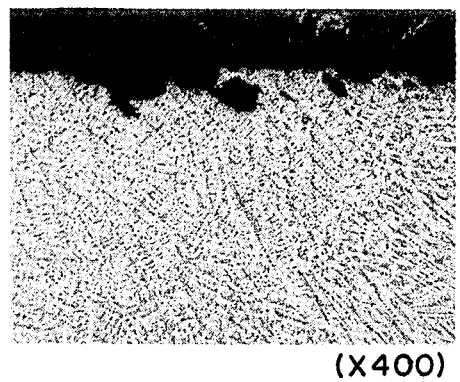
Figure 5:
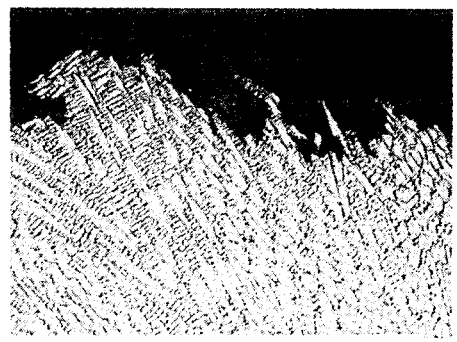

After the test, the sections of the samples were examined microscopically to check for any integranular corrosion thereby to clarify any realtionship between the chemical composition of the welding material and the integranular corrosion, the result of which is shown in Table 1 and FIGS. 2 to 5. More specifically, FIG. 2 shows the microscopic photo of the section in the sample obtained through welding with the welding material No. 2 of the invention, while FIGS. 3, 4, and 5 show the microscopic photos of the sections of comparison materials Nos. 7, 8 and 9, respectively. As will be seen from FIG. 2, the sample obtained with the use of the welding material exhibits almost no intergranular corrosion, while the samples obtained with the use of comparison welding materials show considerable selective corrosion in the weld part, as will be seen from FIGS. 3 to 5.

While the invention has been particularly shown and described with reference to preferred embodiments thereof, it will be understood by those skilled in the art that the foregoing and other changes in form and details may be made therein without departing from the spirit and scope of the invention.

TABLE 1

| Sample Nos. | Kind of material | C | Si | Mn | Cr | Ni | N | Ni-bal | Result* |
|---|---|---|---|---|---|---|---|---|---|
| 1 | welding material of invention | 0.010 | 0.63 | 1.00 | 25.88 | 7.31 | 0.101 | −10.16 | o |
| 2 | welding material of invention | 0.011 | 0.61 | 0.97 | 26.43 | 10.32 | 0.120 | −7.15 | o |
| 3 | welding material of invention | 0.011 | 0.67 | 1.04 | 26.92 | 8.40 | 0.107 | −10.06 | o |
| 4 | welding material of invention | 0.009 | 0.60 | 1.04 | 27.57 | 10.32 | 0.105 | −8.86 | o |
| 5 | welding material of invention | 0.012 | 0.64 | 1.02 | 28.60 | 9.95 | 0.097 | −7.66 | o |
| 6 | comparison welding material | 0.013 | 0.58 | 1.20 | 27.81 | 6.16 | 0.095 | −13.35 | x |
| 7 | comparison welding material | 0.013 | 0.65 | 1.07 | 26.61 | 6.06 | 0.103 | −12.07 | Δ |
| 8 | comparison welding material | 0.014 | 0.63 | 1.06 | 27.16 | 14.27 | 0.104 | −4.39 | x |
| 9 | comparison welding material | 0.019 | 0.67 | 1.05 | 27.45 | 18.43 | 0.106 | −0.40 | x |
| 10 | comparison welding material | 0.010 | 0.63 | 1.08 | 26.38 | 21.55 | 0.098 | 3.47 | x |

*Result of microscopic examination of samples
o: No intergranular corrosion observed
Δ: Slight intergranular corrosion
x: Heavy intergranular corrosion

We claim:

1. A welding material of ferrite-austenite two-phase stainless steel consisting essentially of not more than 0.03% of C, not more than 2.0% of Si, not more than 2.0% of Mn, 25 to 30% of Cr, 7 to 12% of Ni, about 0.1 to 0.35% of N, and the balance Fe and inevitable impurities, wherein the Ni balance value given by the following formula ranges between −11.7 and −6.7:

$$\text{Ni balance value} = -\text{Ni\%} + 0.5 \times \text{Mn\%} + 30 \times (\text{C} + \text{N}) - 1.1(\text{Cr\%} + 1.5 \times \text{Si\%}) + 8.2.$$

2. A method for welding metals using a corrosion resistant welding material of ferrite-austenite two-phase stainless steel comprising the steps of:

providing a corrosion resistant welding material consisting essentially of not more than 0.03% of C, not more than 2.0% of Si, not more than 2.0% of Mn, 25 to 30% of Cr, 7 to 12% of Ni, about 0.1% to 0.35% of N, and the balance Fe and inevitable impurities, wherein the Ni balance valve given by the following formula ranges between $-11.7$ and $-6.7$:

$$\text{Ni balance value} = \text{Ni}\% + 0.5 \times \text{Mn}\% + 30 \times (\text{C}+\text{N})\% - 1.1(\text{Cr}\% + 1.5 \times \text{Si}\%) + 8.2;$$

providing two ferrite-austenite two-phase stainless steel objects to be joined; and welding said objects with said welding material.

3. The method of claim 2 wherein said welding comprises TIG welding.

4. The welding material of claim 1 wherein said N is about 0.1 percent.

5. The welding material of claim 1 wherein said Cr is about 27 percent.

6. The welding material of claim 1 wherein said Ni is about 8 percent.

7. The welding material of claim 1 wherein said Cr is about 27 percent, said Ni is about 8 percent, and said N is about 0.1 percent.

* * * * *